US 6,711,776 B1

(12) United States Patent
Krause et al.

(10) Patent No.: US 6,711,776 B1
(45) Date of Patent: Mar. 30, 2004

(54) WINDSHIELD WASHER SYSTEM FOR AUTOMOTIVE VEHICLE

(75) Inventors: Edward K. Krause, Ann Arbor, MI (US); Scott Alan Wojan, Novi, MI (US); Timothy John Wallington, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,978

(22) Filed: Sep. 5, 2002

(51) Int. Cl.[7] ................................. B60S 1/48
(52) U.S. Cl. ................ 15/250.05; 188/71.6; 219/203
(58) Field of Search ................. 188/71.6; 219/200, 219/201, 202, 203; 15/250.05

(56) References Cited

U.S. PATENT DOCUMENTS

| | | | |
|---|---|---|---|
| 3,590,960 A | * | 7/1971 | Reynolds ............... 188/71.6 |
| 3,888,412 A | | 6/1975 | Lindo |
| 4,090,668 A | | 5/1978 | Kochenour |
| 4,575,003 A | | 3/1986 | Linker et al. |
| 4,832,262 A | * | 5/1989 | Robertson ............... 239/129 |
| 5,183,099 A | | 2/1993 | Bechu |
| 5,291,960 A | | 3/1994 | Brandenburg et al. |
| 5,354,965 A | * | 10/1994 | Lee ...................... 219/202 |
| 5,394,963 A | | 3/1995 | Deane et al. |
| 5,509,606 A | * | 4/1996 | Breithaupt et al. ...... 239/130 |
| 5,522,453 A | | 6/1996 | Green |
| 5,585,681 A | | 12/1996 | Bitsche |
| 6,281,649 B1 | * | 8/2001 | Ouellette et al. ........ 318/443 |
| 6,364,010 B1 | * | 4/2002 | Richman et al. ........ 165/202 |

* cited by examiner

*Primary Examiner*—Bentsu Ro
(74) *Attorney, Agent, or Firm*—Gigette Bejn

(57) ABSTRACT

A windshield washer system for an automotive vehicle includes a reservoir for holding windshield washer fluid, and an applicator system for furnishing washer fluid from the reservoir to an exterior surface of the vehicle. A heat transfer system recovers heat from a braking system of the vehicle and conveys the recovered heat to the washer fluid contained within the reservoir.

13 Claims, 2 Drawing Sheets

WINDSHIELD WASHER SYSTEM FOR AUTOMOTIVE VEHICLE

BACKGROUND OF INVENTION

1. Field of the Invention

The present invention relates to a system for providing cleaning fluid to the exterior surface of a windshield or other vision unit installed in an automotive vehicle. As used herein, the term "vision unit" thus means a glazing panel of a vehicle, whether the panel is fixed or movable.

2. Disclosure Information

Automotive designers have utilized a variable plethora of systems for providing washer fluid or other cleaning liquids to the exterior surfaces of automotive windshields. Typically, automobiles used in areas subjected to sub-freezing temperatures will utilize washer fluid having freezing point depressants. Such depressants are all ultimately released to the atmosphere when the washer fluid is dispensed, and may participate in the formation of photochemical smog. The present inventive system allows the use of washer fluid having either no freezing point depressant chemical or a very low level of such additive, so as to minimize the release of any substance other than neat water to the environment.

U.S. Pat. No. 3,888,412 illustrates a system in which windshield washer fluid is heated by means of a heat exchanger which is itself warmed by circulating engine coolant. A system according to present invention is, however, suitable for use with vehicles either of the electrodrive variety in which no engine is used, or the hybrid style in which both an engine and an electrodrive system including a traction motor are employed.

SUMMARY OF INVENTION

A windshield washer system for an automotive vehicle includes a reservoir for holding windshield washer fluid, an applicator system for furnishing washer fluid from the reservoir to an exterior surface of a vehicle, and a heat transfer system for recovering heat from a braking system of the vehicle and for conveying the recovered heat to the washer fluid contained within the reservoir.

According to another aspect of the present invention, a braking system may comprise either a friction braking system including one or more brake calipers or expanding internal brakes, or it may comprise a regenerative braking system of an electrodrive vehicle having at least one traction motor, with the heat transfer system circulating a fluid through the traction motor to recover heat from the traction motor and to transfer the recovered heat to the windshield washer fluid reservoir.

According to another aspect of the present invention, the present system may further comprise a heat exchanger for transferring heat from engine coolant to washer fluid within the washer fluid reservoir.

According to another aspect of the present invention, a windshield washer system according to this invention may be employed in connection with a heated windshield.

According to another aspect of the present invention, a method for providing heated washer fluid to the windshield of an automotive vehicle may comprise the steps of maintaining a supply of washer fluid within the reservoir, recovering heat from a braking system of the vehicle, conveying the recovered heat to the washer fluid within the reservoir, and furnishing heated fluid from the reservoir to the windshield.

It is an advantage of the present invention that heat which would otherwise be rejected to the environment is used to reduce the need for anti-icing agents which could participate in the formation of photochemical smog.

It is a further advantage of the present invention that the windshield washer fluid may be heated so as to assist in de-icing the windshield when the engine of a hybrid vehicle is operating at an average power level that is insufficient to generate enough waste heat to warm the washer fluid and windshield.

Other advantages, as well as objects and features of the present invention, will become apparent to the reader of this specification.

DETAILED DESCRIPTION

Figure 1:
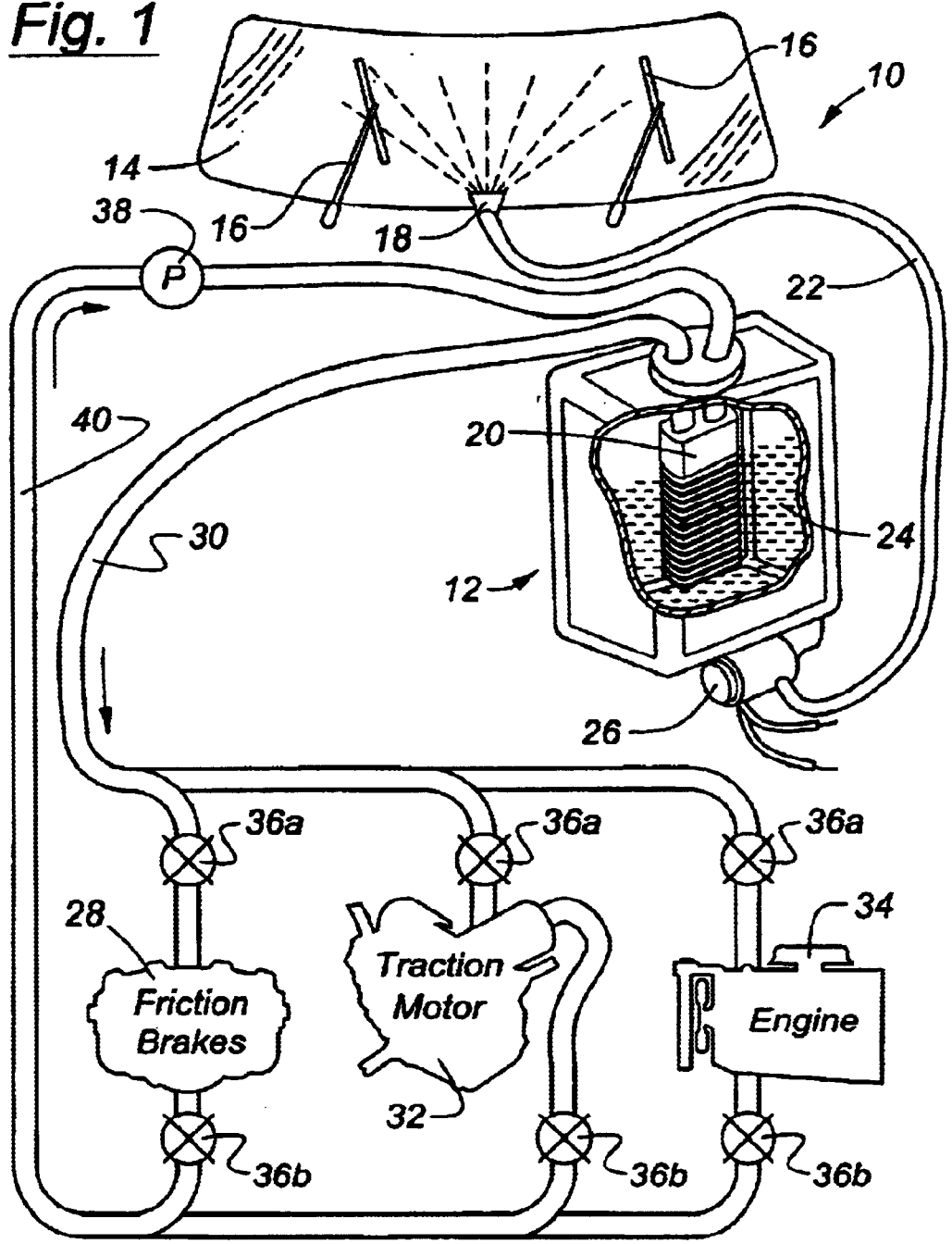
FIG. 1 is a schematic representation of a windshield washer system according to the present invention.

As shown in FIG. 1 windshield washer system 10 provides washer fluid 24 from a reservoir 12 to windshield 14. Washer fluid is sprayed upon or furnished to windshield 14 by means of nozzle 18. Then, wipers 16 further perform the cleaning function. Washer fluid 24, as noted above, which may either be neat water or water with a detergent additive, or water with minimal amount of anti-freeze contained therein, is picked up from reservoir 12 by pump 26 and passed through line 22 to nozzle 18.

Washer fluid 24 is kept above the freezing point by a heat transfer system including heat exchanger 20 mounted within reservoir 12. Heat exchanger 20 is thus part of a heat transfer system for recovering heat from a braking system of a vehicle and for conveying recovered heat to washer fluid 24 contained within reservoir 12. A coolant fluid such as oil, or an ethylene glycol/water mixture, or other type of heat transfer fluid known to those skilled in the art and suggested by this disclosure, is circulated by means of pump 38 through friction braking system 28, through traction motor 32, and even through engine 34. Of course, if the vehicle is exclusively an electrodrive vehicle, engine 34 will not be utilized, and traction motor 32 and friction braking system 28 will therefore be the sole sources of heat for the present system. As a practical matter moreover, friction brakes may not be employed with the vehicle but some braking via traction motor 32 will generally be available and as a result, coolant would be circulated by means of pump 38 through traction motor 32 and into heat exchanger 20, so as to warm the washer fluid 24 contained within reservoir 12. A plurality of valves 36b is shown as controlling the flow of cooling fluid from friction brake system 28, from traction motor 32 and from engine 34 through line 30 and pump 38 to heat exchanger 20. Coolant then circulates via line 30 from heat exchanger 20 and through valves 36a to friction brakes 28, traction motor 32, and engine 34.

Figure 3:
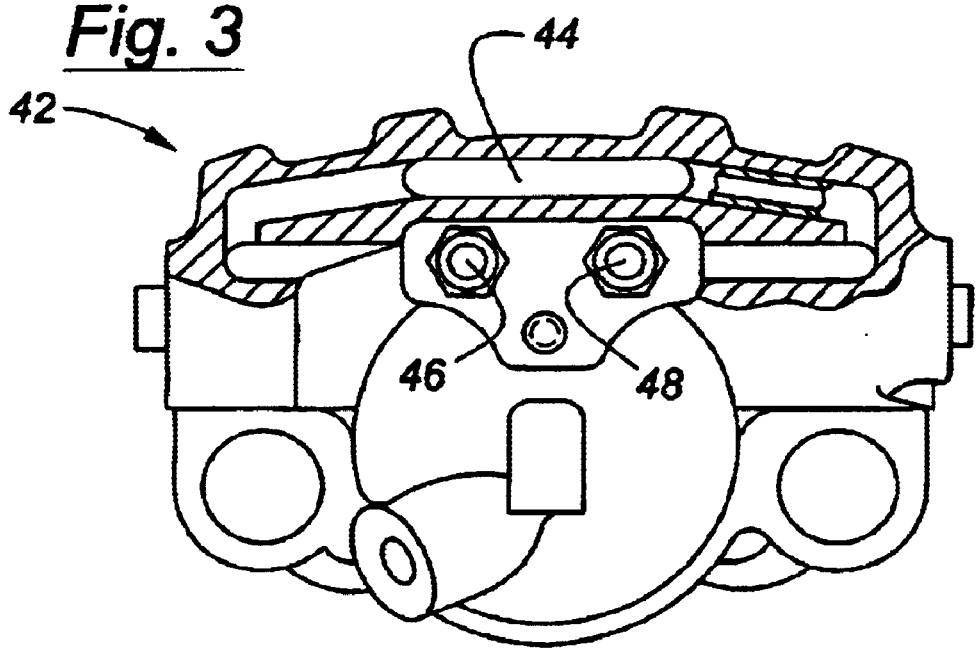
FIG. 3 is a representation of a brake caliper having a cooling passage disposed therein to recover heat from the caliper and to transfer the recovered heat to a windshield washer fluid reservoir.

FIG. 3 illustrates brake caliper 42, which comprises part of friction braking system 28, from which heat is recovered and thereby made available for conveyance to washer fluid 24 within reservoir 12. Brake caliper 42 has cooling passage 44 formed therein. Coolant enters brake caliper cooling passage 44 through fitting 46 and is discharged through fitting 48. Then, the fluid is circulated by means of pump 38 to heat exchanger 20.

Figure 2:
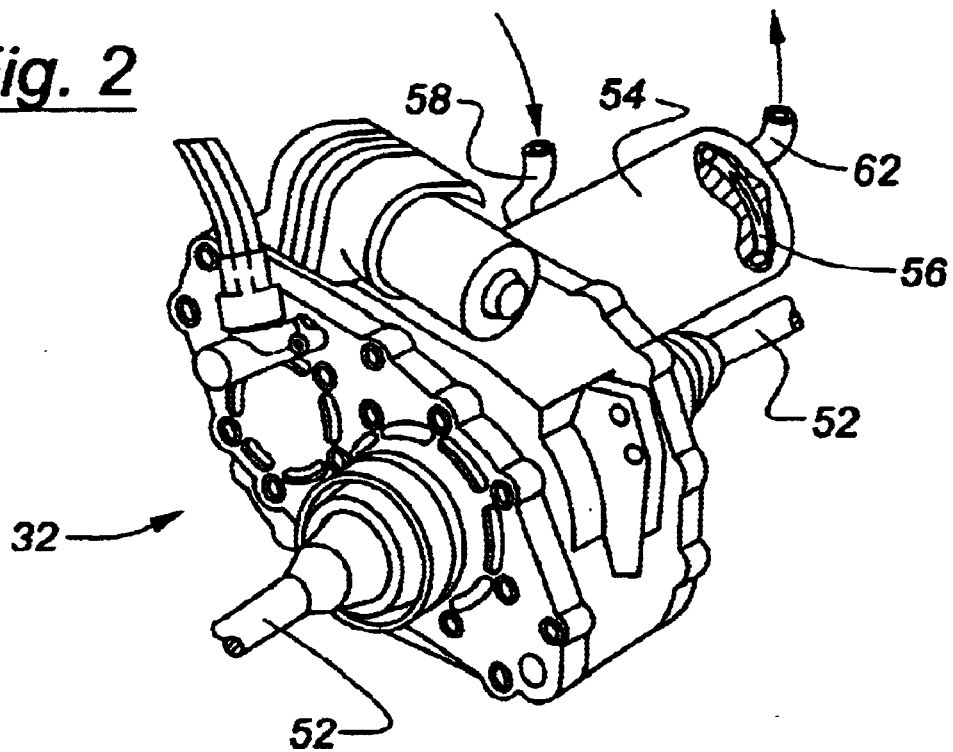
FIG. 2 is a schematic representation of a traction motor having coolant passages for circulating a coolant fluid through the traction motor to recover heat from the traction motor according to an aspect of the present invention.

FIG. 2 illustrates traction motor assembly 32 having a motor 54, which provides power to output shafts 52. Motor 54 generates heat and this is true regardless of whether motor 54 is being operated as a motor or as an electrodynamic brake, or both. Coolant passage 56 is provided within motor 54. This passage, which can be a coiled tube, an annulus or other type of passage known to those skilled in the art suggested by this disclosure, allows coolant which enters at coolant inlet 58 and is discharged at coolant outlet 62, to circulate through motor 54, thereby recovering heat from traction motor 54 and allowing transfer of recovered heat to fluid 24 within windshield washer reservoir 12.

According to another aspect of the present invention, a method for providing heated washer fluid 24 to windshield 14 of an automotive vehicle includes the steps of maintaining a supply of washer fluid 24 within a washer fluid reservoir 12, recovering heat from a braking system of the vehicle, which may be a friction braking system 28, or a traction motor 32, and conveying recovered heat by means of circulating pump 38 to heat exchanger 20 so as to provide heat to washer fluid 24 within reservoir 12. The present method further includes the steps of heating fluid 24 within reservoir 12 with a heat exchanger 20 being provided with engine coolant circulated from engine 34. Those skilled in the art will appreciate in view of this disclosure that although a single coolant circuit is shown having a single pump 38 in FIG. 1, separate heat exchangers 20 and separate coolant pumps and circuits could be used for each of the friction braking system, the traction motor and engine 34. This is a matter of design choice commended to those wishing to employ a system according to the present invention.

In addition to the heating provided by a system according to the present invention, windshield 14 may be heated by means of a conventional coolant radiator heater, or by electric heating, or by other systems and devices known to those skilled in the art, who will also appreciate that the fluid line 22, nozzle 18, and pump 38 may either be heated by recirculating heated fluid 24 from reservoir 12, or by electrical resistance heating or by other known means.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A windshield washer system for an automotive vehicle, comprising:
a reservoir for holding windshield washer fluid;
an applicator system for furnishing washer fluid from the reservoir to an exterior surface of a vehicle; and
a heat transfer system for recovering heat from a braking system of the vehicle and for conveying the recovered heat to the washer fluid contained within the reservoir.

2. A windshield washer system according to claim 1, wherein said applicator system furnishes washer fluid to a windshield.

3. A windshield washer system according to claim 1, wherein said windshield washer fluid is water based.

4. A windshield washer system according to claim 1, wherein said windshield washer fluid is neat water.

5. A windshield washer system according to claim 1, wherein said braking system comprises a friction braking system.

6. A windshield washer system according to claim 5, wherein said friction braking system comprises a brake caliper adapted to engage a brake rotor, with said heat transfer system circulating a fluid through the caliper to recover heat from the caliper and to transfer the recovered heat to the windshield washer fluid reservoir.

7. A windshield washer system according to claim 1, wherein said braking system comprises a regenerative braking system of an electrodrive vehicle.

8. A windshield washer system according to claim 1, wherein said braking system comprises a regenerative braking system of an electrodrive vehicle having at least one traction motor, with said heat transfer system circulating a fluid through the traction motor to recover heat from the traction motor and to transfer the recovered heat to the windshield washer fluid reservoir.

9. A windshield washer system according to claim 1, further comprising a heat exchanger for transferring heat from engine coolant to washer fluid within said reservoir.

10. A windshield system for a motor vehicle, comprising:
a heated windshield;
a reservoir for holding windshield washer fluid;
an applicator system for furnishing washer fluid from the reservoir to an exterior surface of the windshield; and
a heat transfer system for recovering heat from a braking system of the vehicle and for conveying the recovered heat to fluid contained within the reservoir.

11. A windshield system according to claim 10, further comprising a heat exchanger for transferring heat from engine coolant to washer fluid within said reservoir.

12. A method for providing heated washer fluid to the vision unit of an automotive vehicle, comprising the steps of:
maintaining a supply of washer fluid within a reservoir;
recovering heat from a braking system of the vehicle and conveying the recovered heat to the washer fluid within the reservoir; furnishing heated fluid from the reservoir to the windshield.

13. A method according to claim 12, further comprising the step of heating the fluid within the reservoir with a heat exchanger having engine coolant circulating therethrough.

* * * * *